(No Model.) 2 Sheets—Sheet 1.
C. H. KOYL.
DRYING APPARATUS.
No. 453,562. Patented June 2, 1891.
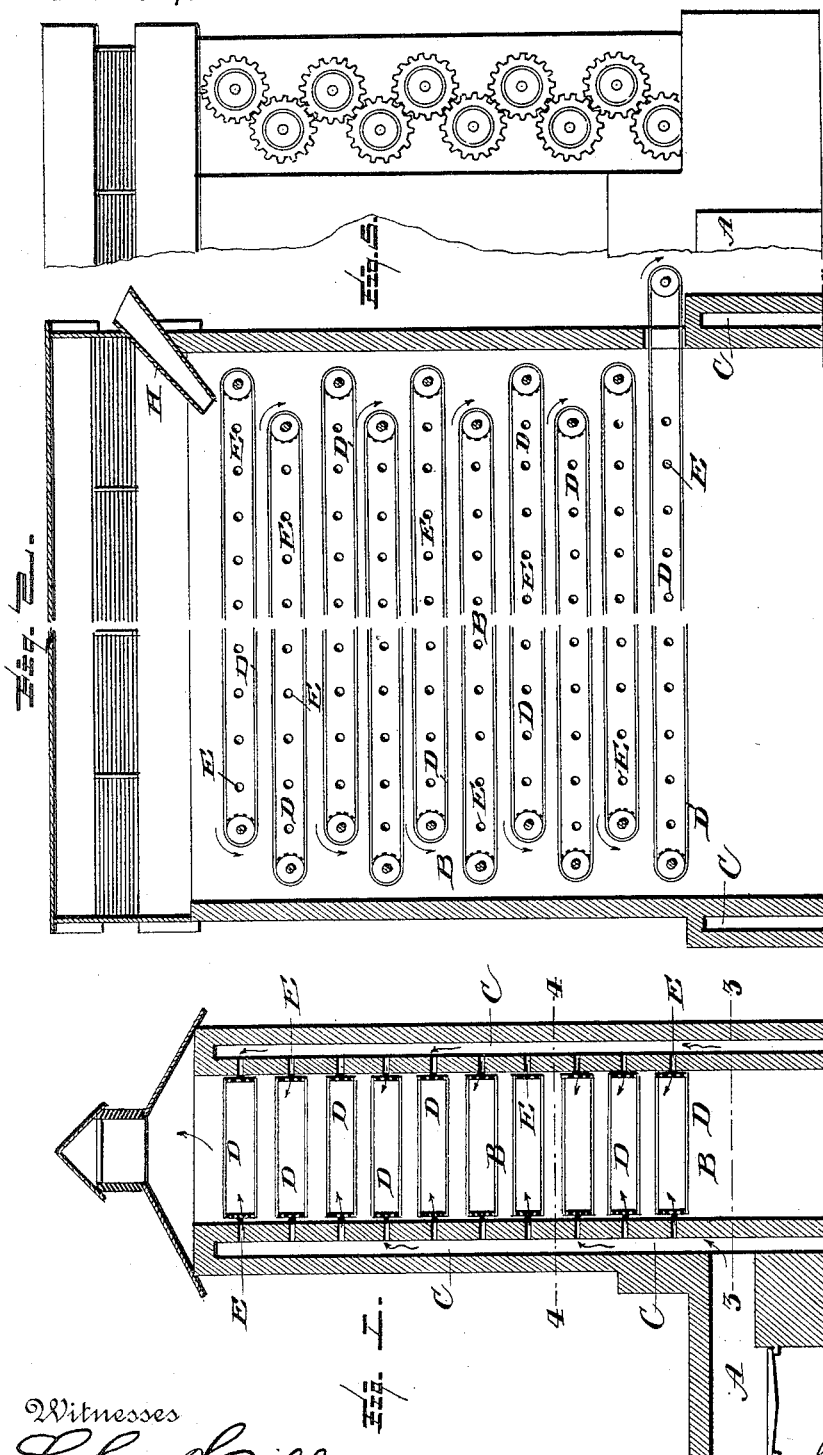
Witnesses
L. E. Hills
William H. Shipley
Inventor
C. H. Koyl
by Marcellus Bailey
Attorney (No Model.) 2 Sheets—Sheet 2.
C. H. KOYL.
DRYING APPARATUS.
No. 453,562. Patented June 2, 1891.
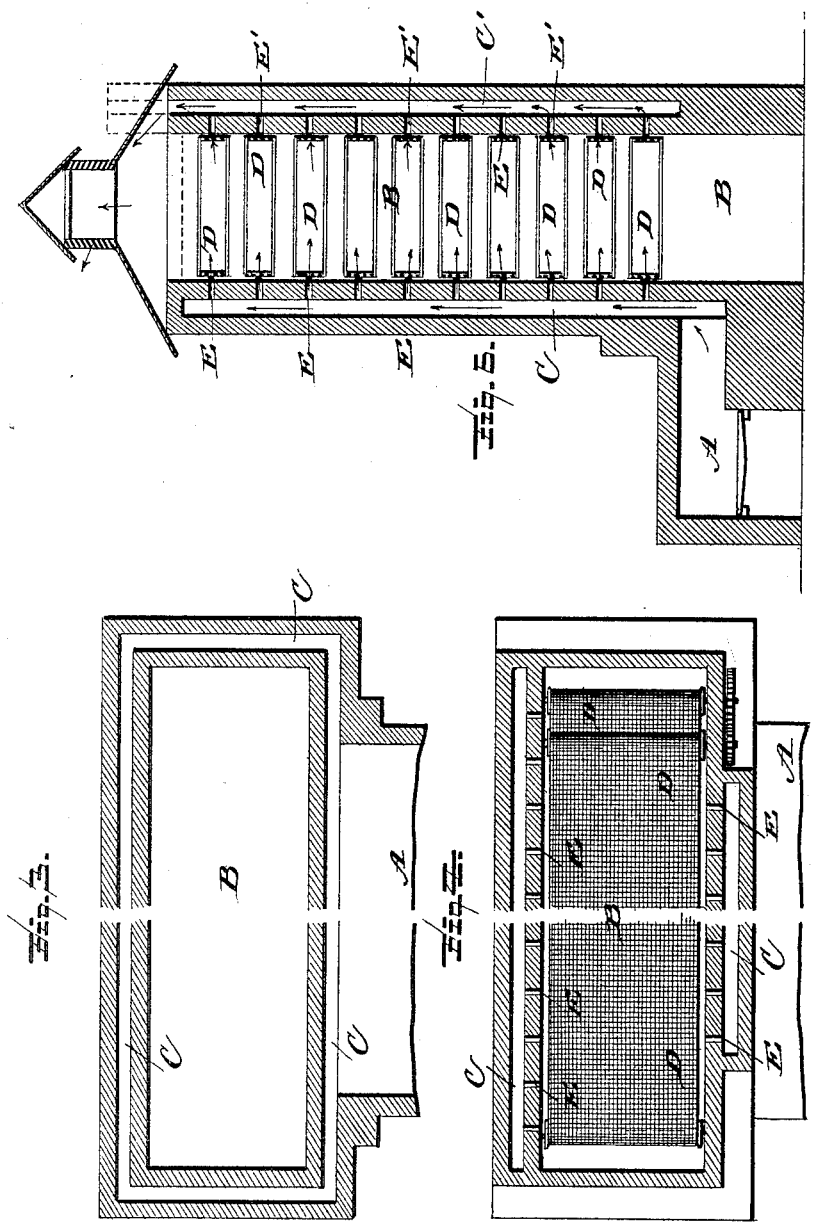

UNITED STATES PATENT OFFICE.

CHARLES HERSCHEL KOYL, OF EASTON, PENNSYLVANIA, ASSIGNOR TO THE NATIONAL DRYING COMPANY, OF NEW JERSEY.

DRYING APPARATUS.

SPECIFICATION forming part of Letters Patent No. 453,562, dated June 2, 1891.

Application filed September 1, 1890. Serial No. 363,712. (No model.)

*To all whom it may concern:*

Be it known that I, CHARLES HERSCHEL KOYL, of Easton, in the county of Northampton and State of Pennsylvania, have invented certain new and useful Improvements in Drying Apparatus, of which the following is a specification.

My improvements have been devised with special reference to the needs of apparatus for drying substances containing a large percentage of moisture. In such apparatus it has for a long time been customary to employ in the drying chamber or flue a series of superposed, staggered, endless, reticulated, or foraminous power-driven aprons arranged to deliver the substance to be dried from one to the other of said aprons successively from above downward, said material being subjected in its passage to the action of heated air or gases, such as the direct products of combustion from a furnace or air heated by steam-pipes or other means. In some cases steam-coils have been arranged at different heights in the drying-chamber, and even at times beneath each apron, with a view, presumably, to keeping the temperature of the air in the drying-room hot to the very top. These methods, however, have lacked efficiency as applied to the drying of substances—such as malt, brewers' grain, &c.—containing a large proportion of moisture, in that the air or gases have been introduced at the lower part of the drying-room only, with the result that after acting upon a few of the lower aprons of the chamber it becomes so saturated with moisture as to have little effect upon the upper ones. The effect of the evaporation is to reduce temperature, and thus cause condensation; but, even if this reduction of temperature be prevented by the use of heating appliances, such as steam-coils at various heights in the chamber, yet the thing that is thus heated is the same air, and as this air is already saturated by acting on the lowermost aprons it has little drying effect upon those above, the heat serving in the main only to prevent reduction of heat to the condensing-point. What I aim at is not merely to keep the temperature of the air in the drying-chamber high to the very top, but to supply or admit fresh hot dry air immediately beneath each apron or at any desired point or points from the lowest apron to the top of the chamber or flue which contains the aprons. In this way I find that I can, other conditions remaining the same, about double the drying capacity of the apparatus. The simplest and on the whole the best way I have found of attaining this result is to jacket the drying flue or chamber, putting the chamber and jacket in communication by pipes or ducts which open immediately beneath each apron and putting the jacket in communication with a furnace to receive the gaseous products of combustion therefrom, these heated products being discharged into the chamber at various points, as desired, and furnishing to each apron the fresh dry hot air or gas which will most efficiently act on the substance carried by the apron. I may of course supply the jacket with hot air or gases heated in other ways; but the plan which I have indicated is the simplest, I think.

I am aware, of course, that it is not new, broadly considered, to combine a drying-chamber with a furnace from which the products of combustion are led into the chamber for drying purposes. I only suggest this in connection with my improvements as a convenient one of the many known plans of obtaining heated air or gases for drying purposes.

The nature of my improvements and the manner in which the same are or may be carried into effect will be readily understood by reference to the accompanying drawings, in which—

Figure 1 is a vertical section of an apparatus embodying my invention, the line of section being crosswise of the length of the endless aprons. Fig. 2 is a vertical section of the same in a plane at right angles to the plane of section in Fig. 1. Fig. 3 is a section on line 3 3, Fig. 1. Fig. 4 is a section on line 4 4, Fig. 1. Fig. 5 is a side elevation of a portion of the apparatus. Fig. 6 is a section, similar to the section in Fig. 1, of a modification hereinafter more particularly referred to.

In the drawings, A represents a furnace.

B is the drying room or chimney. It in fact is the chimney of the furnace.

C is the jacket into which the products of combustion from the furnace are discharged.

D are the staggered, power-driven, endless, reticulated, or skeleton aprons.

E are the ducts or pipes through which the heated gases from the jacket are discharged into the chamber immediately beneath each apron. Indeed, the gases are preferably thus discharged, not merely immediately beneath each apron, but immediately below the upper web of each apron, to which end the ducts or passages pertaining to each apron open into the chamber or chimney at a point between the upper and lower webs of the apron to which they belong.

Immediately below the lowermost apron the jacket C is continuous around all four sides of the chimney or room B. Above that point, however, it is continued upon only the broadest sides of the chimney, (in the direction of the length of the aprons,) where the ducts E are situated, and, as shown in section in Fig. 4, the outer walls of the jacket are of less extent than the inner ones, so as to afford a place for the journals of the rollers on which the endless aprons are mounted and for the gearing by which the said rollers are actuated, as seen in Fig. 5. The material is supplied to the topmost apron through a hopper H and is conducted from the lowermost apron either by extending that apron through the side of the chamber, as in Fig. 2, or in any other known or suitable way.

In practice I make use of a chamber or chimney about thirty-five feet high and thirty feet long and six feet wide, inside measurement. For such a chamber a furnace having about sixty square feet of grate-surface will answer.

With a drying apparatus of this kind, in which a supply of fresh hot dry air or gas is furnished at each point, the water contained in the substance to be dried is taken up and carried off as soon as it takes the form of vapor, while vaporization, instead of being retarded, is hastened, and, as above said, the capacity of the apparatus for useful work is about doubled. It will be noticed that the ducts E are in opposite sides of the chimney or chamber, facing each other and opening into the spaces between the upper and lower webs of the several aprons. In some instances it may be desirable to run the air directly through these spaces from side to side to prevent the air from the lower aprons (which air must be more or less saturated) from interfering with the effective action of the dry air as it enters the chimney above; and in this case I modify the apparatus, as seen in Fig. 6—that is to say, I cut off the direct connection between the furnace and the right-hand portion of the jacket (lettered C' in Fig. 6) and open this portion C' at the top, so that it becomes in effect a flue. The result of this arrangement is that the openings or ducts E of the jacket C become inlet-openings for the hot air or gas, while the openings or ducts (lettered E' in Fig. 6) of the part C' become outlet-passages through which the heated air of the chamber B escapes. In this way wet air from below will be prevented to a great extent, if not entirely, from rising in the chamber and mingling with the dry hot air above. This same result could be arrived at in the apparatus in Figs. 1 to 5, inclusive, by furnishing the right-hand jacket-flue with a damper at the top to open or close it at that point, and also with a damper below to open or close communication between it and the furnace.

Having described my improvements and the best way now known to me of carrying the same into effect, what I claim herein as new and of my own invention is—

1. The combination, with the drying-chamber and endless power-driven drying-aprons therein, of ducts or inlets opening immediately beneath each apron and means for supplying the same with hot dry air or gas, whereby dry hot fresh air or gas is admitted immediately beneath each apron, substantially as and for the purposes hereinbefore set forth.

2. The combination, with the drying-chamber of a drying apparatus and the endless power-driven aprons therein, of a series of inlets at different heights in said chamber and means for supplying dry hot air or gases to the same, the supply of air to each inlet being independent of the others, as and for the purposes hereinbefore set forth.

3. The combination, with the drying-chamber of a drying apparatus and the endless power-driven aprons therein, of air-inlets opening into the chamber at points between the upper and lower webs of the several aprons, so that the air or gas shall be discharged immediately below and in contact with the wet material on the upper web, and means for supplying dry air to said inlets, substantially as and for the purposes hereinbefore set forth.

4. The combination, with the drying-chamber of a drying apparatus and the endless power-driven aprons therein, of air-inlets opening into one side of said chamber at various heights and beneath the carrying-surface of the several aprons therein, means for supplying dry air to said inlets, outlets or exit-openings on the other side of the chamber for the escape of the air thus supplied to the chamber, and a flue for leading off the air thus discharged, substantially as and for the purposes hereinbefore set forth.

5. The combination, with the drying-chamber of a drying apparatus and the endless power-driven aprons therein, of inlets on one side opening into the spaces between the upper and lower webs of the several aprons, means for supplying dry air to the chamber through said inlets, similarly-located outlets or exit-openings in the opposite side of the chamber, and a flue for conducting off the
5 air discharged through said exit-openings, substantially as and for the purposes hereinbefore set forth.

In testimony whereof I have hereunto set my hand this 25th day of August, 1890.

CHARLES HERSCHEL KOYL.

Witnesses:
EWELL A. DICK,
W. H. SHIPLEY.